2,971,978

PROCESS OF PRODUCING 1β-CARBOXYMETHYL-2β - METHOXYCARBONYL - 3α - METHOXY - 4β-ACETOXY-6-β-FORMYL CYCLOHEXANE

Robert Joly, Montmorency, Georges Muller, Nogent-sur-Marne, and Julien Warnant, Neuilly-sur-Seine, France, assignors to Les Laboratoires Français de Chimiotherapie, Paris, France, a corporation of France No Drawing. Filed Apr. 11, 1958, Ser. No. 727,780

Claims priority, application France June 21, 1957

6 Claims. (Cl. 260—468)

The present invention relates to an improved process of producing a substituted aldehyde and, more particularly, to an improved process of producing 1β-carboxy methyl-2β-methoxy carbonyl-3α-methoxy-4β-acetoxy-6β-formyl cyclohexane.

In co-pending application Serial No. 693,028 of Georges Muller, Gerard Nomine, and Julien Warnant, filed October 29, 1957, and entitled "Polycyclic compounds and Process of Preparing Same," and now U.S. Patent 2,952,682, a process of preparing reserpine is described in which 1β-carboxy methyl-2β-methoxy carbonyl-3α-methoxy-4β-acetoxy-8β-formyl cyclohexane of Formula I is an important intermediate. This compound is prepared by reacting the methyl ester of 3β-acetoxy-2α-methoxy-7-oxo-1,2,3,4,4aα,7,8,8aα - octahydronaphthalene-1β-carboxylic acid of Formula II with ozone and decomposing the resulting ozonide of Formula III by means of water at room temperature.

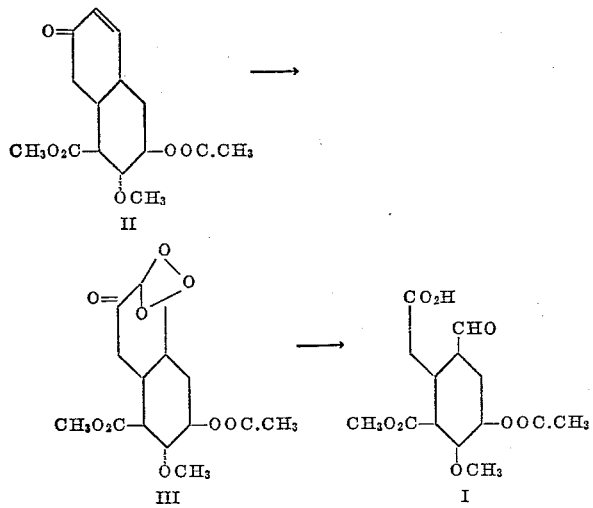

Thereby the reaction product is obtained in a yield of about 60%. In the course of the multistep synthesis of reserpine described in said application Serial No. 693,028 it is, of course, very desirable to achieve very high yields of the intermediate used in the early stages of the process.

Therefore, it is one object of the present invention to provide a simple and more efficient process of producing said valuable intermediate in the synthesis of compounds of the reserpine series, the 1β-carboxy methyl-2β-methoxy carbonyl-3α-methoxy-4β-acetoxy-6β-formyl cyclohexane.

Other objects of the present invention and advantageous features thereof will become apparent as the description proceeds.

In principle, the process according to the present invention consists in decomposing the ozonide of the methyl ester of 3β-acetoxy-2α-methoxy - 7 - oxo-1,2,3,4,4aα,7,8,8aα-octahydronaphthalene-1β-carboxylic acid of Formula III at a very low temperature such as at a temperature lower than —15° C., and preferably at a temperature between —15° C. and —30° C., and in the presence of a phenolic antioxidant, preferably in the presence of hydroquinone. When working according to this method, the final aldehyde product is obtained in a yield of about 80%.

The following example serves to illustrate the present invention without, however, limiting the same thereto. More particularly, the nature of the solvent used in the ozonization step may be changed and, for instance, cyclohexane or chlorinated solvents such as chlorinated aliphatic hydrocarbons may be used in place of ethyl acetate, the antioxidant may be used in amounts higher than those shown in the example and other phenolic antioxidant compounds may be used in place of hydroquinone in accordance with the principles set forth herein and in the claims annexed thereto.

EXAMPLE

*Preparation of 1β-carboxy methyl-2β-methoxy carbonyl-3α-methoxy-4β-acetoxy-6β-formyl cyclohexane (Formula I)*

250 g. of the methyl ester of 3β-acetoxy-2α-methoxy-7-oxo-1,2,3,4,4aα,7,8,8aα - octahydronaphthalene-1β-carboxylic acid, prepared according to the method described in said co-pending application Serial No. 693,028, are dissolved in 5 liters of ethyl acetate with stirring. While continuing stirring, the solution is cooled to —20° C. and oxygen containing 2% of ozone is passed through the solution in an amount of about 2.6 liters per minute for 8 to 9 hours until the color of the solution has turned green. Excess ozone is removed by passing nitrogen through the reaction mixture at —20° C. The last traces of ozone are destroyed by the addition of a solution of 5 g. of the starting material in 25 cc. of ethyl acetate cooled to —20° C. While stirring and passing further nitrogen through the solution, 2.5 liters of water cooled to +2° C. and containing 2.5 g. of hydroquinone are added in small amounts within half an hour without allowing the temperature of the solution to rise higher than —15° C. and while keeping said temperature preferably at about —20° C. by means of a powerful cooling bath. The temperature of the reaction mixture is slowly increased by immersing the reaction vessel into a water bath allowing the temperature to rise to 0° C. within 15 minutes, then to 5° C. within 30 more minutes, and finally, to +30–35° C. within 30 more minutes. During this procedure, nitrogen is passed through the mixture and vigorous stirring is maintained. In order to cause the acid compound of Formula I to pass from the organic solvent phase into the aqueous phase, it is converted into its sodium salt by adding quite rapidly 175 g. of sodium bicarbonate to the reaction mixture after previously cooling the mixture to +5° C. While keeping the temperature below +10° C., the aqueous layer is separated. The ethyl acetate layer is washed with a saturated sodium bicarbonate solution cooled to +5° C. until the wash waters remain alkaline. The wash waters are combined with the aqueous solution separated previously from the organic solvent layer. They are then extracted with methylene chloride and are acidified to a pH of 1.0 by the addition of hydrochloric acid. During extraction and acidification the temperature of the solution is still kept below +5° C. The acidified aqueous mixture is saturated with sodium chloride and extracted several times by means of methylene chloride. The combined extracts are washed with a saturated sodium chloride solution, dried over magnesium sulfate, filtered, and, after the addition of 0.2 g. of hydroquinone, evaporated to dryness in a vacuum. After drying, 224 g. (83% of the theoretical amount) of the desired aldehyde of Formula I are obtained. By triturating said aldehyde with isopropyl ether, filtering with suction, and drying, 215 g. of pure 1β-carboxy methyl - 2β - methoxy carbonyl-3α-methoxy-4β-acetoxy-6β-formyl cyclohexane are obtained. The compound melts first at 140–145° C. and then at 159–160° C. and has a rotatory power of $[\alpha]_D^{20} = +42.5°$ (concentration: 1% in pyridine). In ethanol, the compound is levorotatory. The compound is identical with the compound described in co-pending application Serial No. 693,028.

*Analysis.*—$C_{14}H_{20}O_8 = 316.30$.—Calculated: 53.16% C; 6.37% H; 40.47% O. Found: 53.1% C; 6.5% H; 40.7% O.

When applying the process described hereinabove to the racemic methyl ester of 3β-acetoxy-2α-methoxy-7-oxo-1,2,3,4,4aα,7,8,8aα-octahydronaphthalene - 1β - carboxylic acid of Formula II, the racemic aldehyde I is obtained in the same yield. This compound is also described in co-pending application Serial No. 693,028.

It may be mentioned that the amount of phenolic antioxidant used in the process according to the present invention is preferably between about 0.2% and about 2.0% of the starting material employed.

We claim:

1. The process of producing dextrorotatory in pyridine 1β-carboxy methyl-2β-methoxy carbonyl-3α-methoxy-4β-acetoxy-6β-formyl cyclohexane, which comprises the steps of subjecting a solution of the methyl ester of 3β-acetoxy-2α-methoxy-7-oxo-1,2,3,4,4aα,7,8,8aα - octahydronaphthalene-1β-carboxylic acid in an inert organic solvent to the action of ozone at a temperature between —15° C. and —30° C., removing the unreacted ozone, decomposing the resulting ozonide at said temperature by means of water in the presence of small amounts of a phenolic antioxidant, thereafter slowly increasing the temperature of the reaction mixture to a temperature of about 35° C., and isolating said dextrorotatory in pyridine 1β-carboxy methyl-2β-methoxy carbonyl-3α-methoxy-4β-acetoxy-6β-formyl cyclohexane.

2. The process according to claim 1, wherein the solution of the starting material is a solution in a solvent selected from the group consisting of ethyl acetate, methyl acetate, cyclohexane, methylene chloride, and chloroform.

3. The process according to claim 1, wherein the phenolic antioxidant used is hydroquinone.

4. The process according to claim 1, wherein the phenolic antioxidant is added in an amount between about 0.2% and 2.0% of the starting material used.

5. The process of producing dextrorotatory in pyridine 1β-carboxy methyl-2β-methoxy carbonyl-3α-methoxy-4β-acetoxy-6β-formyl cyclohexane, which comprises the steps of subjecting the methyl ester of 3β-acetoxy-2α-methoxy-7-oxo-1,2,3,4,4aα-7,8,8aα-octahydronaphthalene - 1β - carboxylic acid in ethyl acetate to the action of ozone at a temperature between —15° C. and —30° C., removing excess ozone by passing nitrogen through the reaction mixture and adding a small amount of the starting material thereto, splitting up the resulting ozonide in solution in an inert organic solvent with water while maintaining a temperature of about —20° C. in the presence of between about 0.2% and about 2.0% of hydroquinone, gradually heating the reaction mixture to 0° C. and then to a temperature between about 30° C. and about 35° C. and purifying the resulting aldo carboxylic acid by converting it into the corresponding sodium salt in aqueous solution, separating the aqueous solution, acidifying the resulting aqueous solution of its sodium salt, and recovering said dextrorotatory in pyridine 1β-carboxy methyl-2β-methoxy carbonyl-3α-methoxy-4β-acetoxy-6β-formyl cyclohexane.

6. The process of decomposing the ozonide having the structural formula

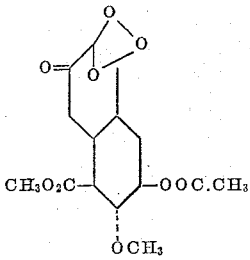

which is formed by the steps of subjecting a solution of the methyl ester of 3β-acetoxy-2α-methoxy-7-oxo-1,2,3,4,4aα,7,8,8aα-octahydronaphthalene-1β-carboxylic acid in an inert organic solvent to the action of ozone at a temperature not exceeding —15° C. and removing the unreacted ozone, which comprises the steps of reacting said ozonide in solution in an inert organic solvent with water containing a small amount of a phenolic antioxidant at a temperature between about —15° C. and about —30° C., thereafter slowly increasing the temperature of the reaction mixture to a temperature of about 35° C. and isolating the dextrorotatory in pyridine 1β-carboxy methyl-2β - methoxy carbonyl-3α-methoxy-4β-acetoxy-6β-formyl cyclohexane.

References Cited in the file of this patent

UNITED STATES PATENTS 2,883,384     Woodward             Apr. 21, 1959

OTHER REFERENCES

Conant: "The Chemistry of Organic Compounds," p. 139, Macmillan, 1939.

Hickinbottom: "Reactions of Organic Compounds," pp. 21–2 (1948).

Fieser et al.: "Organic Chemistry," p. 402 (1956).

Woodward et al.: J. Am. Chem. Soc., 78, 2023–5 (1956).